(No Model.)
J. L. CLARK.
BAIL AND COVER ATTACHMENT.
No. 596,481. Patented Jan. 4, 1898.
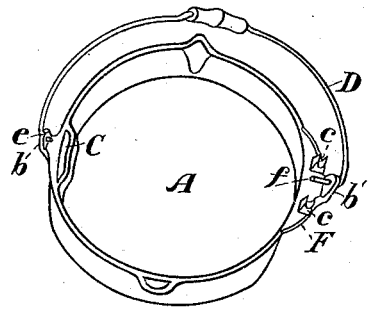
Fig. 1
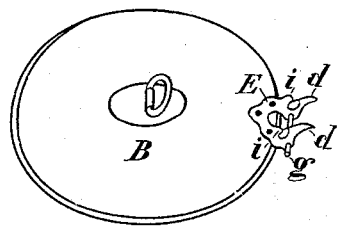
Fig. 2
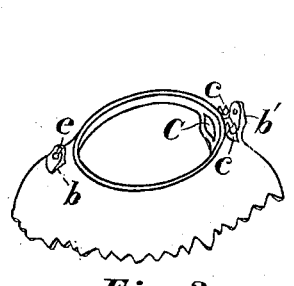
Fig. 3
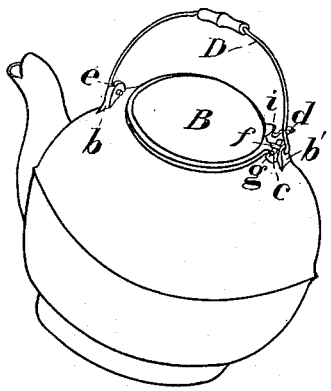
Fig. 4
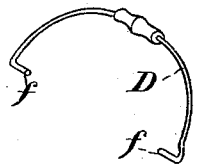
Fig. 5
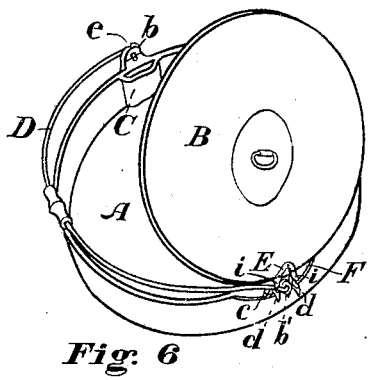
Fig. 6
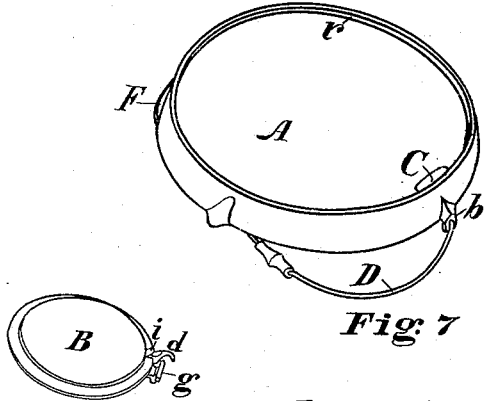
Fig. 7 / Fig. 8
Witnesses:
P. M. Lander
Hugo Clark
Inventor:
John L. Clark

UNITED STATES PATENT OFFICE.

JOHN L. CLARK, OF BANGOR, MAINE, ASSIGNOR TO SAMUEL H. BOARDMAN, OF SAME PLACE.

BAIL AND COVER ATTACHMENT.

SPECIFICATION forming part of Letters Patent No. 596,481, dated January 4, 1898.

Application filed June 7, 1897. Serial No. 639,655. (No model.)

*To all whom it may concern:*

Be it known that I, JOHN L. CLARK, a citizen of the United States, and a resident of Bangor, in the county of Penobscot and State of Maine, have invented new and useful Improvements in Bail and Cover Attachments Whereby Certain Movements of the Bail Tend to Operate the Cover; and I do hereby declare that the following is a full, clear, and exact description of the invention, which will enable others skilled in the art to which it appertains to make and use the same.

Throughout the description reference is made to the accompanying drawings, forming part of this application, in which—

Figure 1 represents a perspective view of a fry-pan as constructed with my improvements with the cover removed. Fig. 2 is a perspective view of a fry-pan cover, showing my invention attached. Fig. 3 is a perspective view showing the top portion of a tea-kettle as constructed with my invention. Fig. 4 represents a perspective view of a tea-kettle, showing my invention complete. Fig. 5 shows a perspective view of a bail as constructed for my invention. Fig. 6 represents a perspective view of a fry-pan constructed with my invention complete and showing the cover in a vertical position as raised by the bail. Fig. 7 is a perspective view of a fry-pan shown in an inverted position to disclose the raised rim at the bottom and outlet of the vent-flue. Fig. 8 shows a perspective view of a tea-kettle cover cast with my invention thereon.

Similar letters of reference refer to correspondingly like parts throughout the different figures.

The object of my invention is to produce means whereby the bail and cover can be attached to hollow ware in such manner that certain movements of the bail will operate to open and close the cover, which makes it particularly applicable for odorless pans and kettles.

A further advantage of my construction is that the bail and cover can be quickly disengaged for cleaning and the cover used separately without the rest of the device when desired.

Referring to the drawings, A represents a cast-iron fry-pan having a protruding handle at the top edge and a pouring-off spout opposite. Midway between the spout and handle and cast upon the side of the pan is a bail-ear $b$, having the usual bail-hole therethrough, and upon the outside of the ear, extending upward from said hole, is a groove $e$, into which the bail enters when in a vertical position. Cast upon the upper edge of the pan diametrically opposite the bail-ear $b$ is a horizontally-projecting ledge F, having rising from its outer edge a bail-ear $b'$ and each side of said ear a stud $cc$, with lateral grooves across their extremities, for a purpose hereinafter to be explained. The outer edge of the ledge F from each side of the bail-ear $b'$ to the edge of the pan A is a raised bead to prevent any liquid that drops or remains upon said ledge from running over the edge. This pan A is provided with an internal wall for a short distance cast around an opening to form a vent C, which extends through the bottom of the pan and is the means whereby the said pan is made odorless. The sides of the pan A project beyond the bottom and produce a circular ridge $r$, which prevents the bottom from coming in contact with the top of a stove and also allows a free vent into a cover-hole when the pan is larger than the opening in the stove and the vent C should not happen to be placed directly over the hole.

B refers to a cover provided with my improvd hinge attachment E, consisting of a metal casting having two upwardly-protruding prongs $d\ d$, extending beyond the edge, connected at their base by a hinge-bar $g$, which has its extremities extend beyond the outer sides of said prongs $d\ d$ sufficiently and in such position as to be adapted to rest within the grooves in the top of the studs $c\ c$, projecting from the ledge F, when the cover is placed upon the top of the pan. Upon the upper side of the hinge attachment E are small cross-grooves formed by small spurs $i\ i$, rising near the base of the prongs $d\ d$. This construction is slightly modified for dishes having small cover-openings, such as cast-iron tea-kettles, as is shown in Figs. 4 and 8 of the drawings, in which the cover B is cast with integral hinge attachment composed of a small projection beyond the edge, with the hinge-bar $g$ extending transversely across the top of the same. For tea-kettle covers only one prong $d$ is used, cast upon the edge, with a space between it and the hinge-bar, and the spur $i$ protrudes from the top of the cover at the base of said prong.

The bail D of my device is curved to the usual shape, with the ends $ff$ bent inward toward each other, as shown in Fig. 5 of the drawings.

The assembling consists in placing the cover B over the dish so that the hinge-bar $g$ will rest in the grooves in the top of the studs $c\ c$. One end of the bail D is inserted in the hole in one of the bail-ears $b$, while the opposite end is placed in the opposite bail-ear $b'$, extending through said ear and over the hinge-bar $g$ to lock the cover in place. With this construction the bail D will extend upwardly between the prongs $d\ d$ of the hinge attachment E and will be retained in an upright position by springing into the vertical groove $e$ in the bail-ear $b$. It can now be readily understood that the cover B can be raised by depressing the bail D, which immediately comes in contact with one of the prongs $d$, and by further depression the leverage against said prong will force the cover to turn upon its hinge and rise into a vertical position while the bail enters a horizontal plane, and that portion bearing against said prong will enter the groove between the prong $d$ and the spur $i$. To lower the cover B in lifting the bail to a vertical position, that portion bearing against the spur $i$ on the hinge attachment will force the cover down until the bail leaves the groove, when the overbalance of its weight will press the prong against the under side of the bail and the cover close without noise and at the same speed that the bail is moved.

Having thus described my invention, what I claim, and desire to secure by Letters Patent of the United States, is—

1. A cover and bail attachment for covered dishes consisting of the combination of bail-ears and studs with cross-grooves rising from said dish or article; with a bail having inwardly-turned extremities; and a cover with projecting prongs and transverse hinge-bar adapted to hinge on said studs, for the purpose described and substantially as set forth.

2. A bail and cover connection for covered dishes, consisting of a curved bail with inwardly-turned ends facing each other; bail-ears having bail-holes; studs with cross-grooves, for the purpose described each side of one bail-ear; a cover with upward and outwardly extending prongs at one edge; and a hinge-bar passing through said prongs in the manner described, and substantially as shown and set forth.

3. A bail and cover connection for covered dishes, consisting of the combination of a dish with protruding bail-ears; upwardly-extending studs near one ear, with cross-grooves in their extremities for the purpose described; a cover with projection beyond its edge and transverse hinge-bar on said projection; a bail with inwardly-turned ends adapted to extend through the bail-ears, and one end extend over the hinge-bar; and a prong extending from the cover in position to come in contact with the bail for the purpose described and substantially as shown and set forth.

4. The combination of a dish with a ledge protruding from its upper edge, and a bail-ear and studs with grooved ends rising from said ledge; and a diametrically opposite bail-ear, with a cover with hinge attachment consisting of parallel prongs extending upward and outward secured to its edge, and a transverse or hinge bar connecting the base of said prongs and projecting from the outer sides of the latter; and a bail adapted to enter the bail-ears and have one extremity extend over the hinge-bar for the purpose described and all substantially as shown and set forth.

JOHN L. CLARK.

Witnesses:
P. W. J. LANDER,
HUGO CLARK.